US008768827B1

(12) United States Patent
Bradford, III et al.

(10) Patent No.: US 8,768,827 B1
(45) Date of Patent: Jul. 1, 2014

(54) SYSTEM AND METHOD FOR OPTIMIZING LOAN MODIFICATIONS

(75) Inventors: Robert L. Bradford, III, Upperco, MD (US); Maria A. Bulycheva, Vienna, VA (US); Steven J Holden, Bethesda, MD (US); Milton P. Reid, III, Auckland (NZ); Jenney H. Shen, Bethesda, MD (US)

(73) Assignee: Fannie Mae, Washington, DC (US)

( * ) Notice: Subject to any disclaimer, the term of this patent is extended or adjusted under 35 U.S.C. 154(b) by 0 days.

(21) Appl. No.: 13/563,498

(22) Filed: Jul. 31, 2012

(51) Int. Cl.
*G06Q 40/00* (2012.01)

(52) U.S. Cl.
USPC .............................................. 705/38; 705/35

(58) Field of Classification Search
USPC ...................................................... 705/35, 38
See application file for complete search history.

(56) References Cited

U.S. PATENT DOCUMENTS

| | | | | |
|---|---|---|---|---|
| 7,191,150 | B1* | 3/2007 | Shao et al. ....................... | 705/38 |
| 7,558,756 | B1* | 7/2009 | Wesly et al. ..................... | 705/38 |
| 7,860,787 | B2* | 12/2010 | Oppenheimer et al. ......... | 705/38 |
| 8,306,893 | B2* | 11/2012 | Plunket ........................ | 705/36 R |
| 8,380,619 | B2* | 2/2013 | Miles et al. ..................... | 705/38 |
| 8,401,950 | B2* | 3/2013 | Lyons et al. ................ | 705/36 R |
| 8,458,074 | B2* | 6/2013 | Showalter ................... | 705/36 R |
| 8,473,391 | B2* | 6/2013 | Erbey et al. ..................... | 705/35 |
| 2001/0044773 | A1* | 11/2001 | Sellers et al. ................... | 705/38 |
| 2002/0007342 | A1* | 1/2002 | Sellers et al. ................... | 705/38 |
| 2005/0278246 | A1* | 12/2005 | Friedman et al. ............... | 705/38 |
| 2010/0088224 | A1* | 4/2010 | Lowell ........................... | 705/38 |
| 2010/0179904 | A1* | 7/2010 | Morano et al. ................. | 705/38 |
| 2010/0198743 | A1* | 8/2010 | Plunket ....................... | 705/36 R |
| 2010/0262534 | A1* | 10/2010 | Kaufman ......................... | 705/38 |
| 2010/0306100 | A1* | 12/2010 | Kaufman ......................... | 705/38 |
| 2011/0016042 | A1* | 1/2011 | Cho et al. ........................ | 705/38 |
| 2011/0022541 | A1* | 1/2011 | Miles et al. ................ | 705/36 R |
| 2011/0060671 | A1* | 3/2011 | Erbey et al. ..................... | 705/35 |
| 2011/0093384 | A1* | 4/2011 | Oppenheimer et al. ........ | 705/38 |
| 2011/0106692 | A1* | 5/2011 | Moore et al. .................... | 705/38 |
| 2011/0184884 | A1* | 7/2011 | Lyons et al. ................ | 705/36 R |
| 2011/0258101 | A1* | 10/2011 | Albertelli et al. ............... | 705/37 |
| 2011/0270779 | A1* | 11/2011 | Showalter ................... | 705/36 R |
| 2012/0271756 | A1* | 10/2012 | Saitta ............................. | 705/38 |

* cited by examiner

*Primary Examiner* — Sara C Hamilton
(74) *Attorney, Agent, or Firm* — Glance Law Group PC (57) ABSTRACT

A computer system for managing defaults that includes a loan investor platform associated with a loan servicer platform. The loan investor platform provides a loss mitigation workout type decision engine that receives from the loan servicer platform a first set of data associated with a loan loss mitigation case, determines an optimum loan workout for the loss mitigation case based on borrower criteria, prequalifies the loan for the optimum loan workout based on at least one investor set business rule and the first set of data, and communicates the loan workout that the loan is prequalified for to the at least one other computing device.

12 Claims, 5 Drawing Sheets

SYSTEM AND METHOD FOR OPTIMIZING LOAN MODIFICATIONS

BACKGROUND OF THE INVENTION

The present application relates to systems and methods for managing loans.

Loss mitigation workouts on home and other loans have increased as efforts have increased to help borrowers cope with the effects of the most recent recession. It is expected that this workout volume trend will continue and remain elevated versus historical norms. This continued increase in workout volumes stresses both the investor's infrastructure for accepting these workouts and the servicers' processing capabilities. Accordingly, there is a need for systems that enable the parties involved in the workout process to better manage the anticipated increase in the volumes of workouts over the next several years. There is also a need for systems that facilitate the implementation of workouts that satisfy the financial requirements of the investor and the borrower.

SUMMARY OF THE INVENTION

In at least one embodiment, a computer system for managing loan defaults is provided herewith that includes at least one computing device in communication with at least one other computing device over a communication network. The at least one computing device has an application associated therewith that provides a loss mitigation decision engine, which enables the at least one computing device to: receive from the at least one other device, over the communication network, a first set of data associated with a loan loss mitigation case; determine an optimum loan workout for the loss mitigation case based on an objective function that considers both investor and borrower outcomes; prequalify the optimum loan workout based on at least one investor set business rule and the first set of data; and communicate the optimum loan workout that the loan is prequalified for to the at least one other computing device.

In another embodiment, the optimum loan workout is selected from a plurality of modified loans that differ by one or more of rate, term, forbearance, rate step, or principal forgiveness In another embodiment, the objective function maximizes the net present value of the cash flow from the modified loan less a penalty based on the loan's estimated re-default rate.

In another embodiment, the optimum loan workout is determined based on an objective function that maximizes the net present value of the cash flow from the modified loan less a penalty based on the modified loan's estimated redefault rate.

In another embodiment, objective function is based on a configurable tradeoff factor.

In another embodiment, the configurable tradeoff factor is expressed as units of net present value dollars per percentage point of redefault.

In another embodiment, the objective function is based on a configurable business rule defining a maximum amount the net present value of the cash flow from the modified loan can be reduced to lower the redefault rate.

In another embodiment, the computer system includes an investor computing device having a user interface, operable with the decision engine to adjust the configurable tradeoff factor and the configurable business rule.

In another embodiment, a computer-implemented data processing system including program logic is provided. The program logic includes loss mitigation data receiving logic, configured to receive data pertaining to a loss mitigation case; generation logic, configured to generate loan workout scenarios for the loss mitigation case, each scenario representing one of a plurality of modified loans that differ by one or more of rate, term, forbearance, rate step, or principal forgiveness; optimizer logic, configured to identify an optimum workout scenario based on an objective function based on the net present value of a cash flow from the modified loan and a redefault rate of the modified loan.

In another embodiment, the objective function is based on a configurable tradeoff factor.

In another embodiment, the configurable tradeoff factor is expressed as units of net present value dollars per percentage point of redefault.

In another embodiment, the objective function is based on a configurable business rule defining a maximum amount the net present value of the cash flow from the modified loan can be reduced to lower the redefault rate.

In another embodiment, adjustment logic is provided to adjust the configurable tradeoff factor and the configurable business rule.

In another embodiment, the generation logic generates a grid of scenarios based on term, rate, and forbearance.

In another embodiment, a method of identifying an optimal loan workout is provided. The method includes the steps of receiving data pertaining to a loss mitigation case, generating loan workout scenarios for the loss mitigation case, each scenario representing one of a plurality of modified loans that differ by one or more of rate, term, forbearance, rate step, or principal forgiveness, and determining an optimum workout scenario based on an objective function based on the net present value of a cash flow from the modified loan and a redefault rate of the modified loan.

Additional aspects of the present invention will be apparent in view of the description which follows.

DETAILED DESCRIPTION OF THE INVENTION

As noted above, loan workouts have been increasing and are expected to continue to increase over the next several years. The present application therefore provides systems and corresponding methods to address the needs of the parties involved in managing loans and particularly in loan workouts. Although the systems and methods of the present application will be described by way of example in relation to particular investors, and investor backed mortgages, it is understood that these methods and system are applicable to other types of investors and other types of loans.

Currently, default management system infrastructure requires that mortgage loan servicers interpret and implement investors' loss mitigation policies, or else submit loss mitigation cases back to investors for decisioning, and provides investors with little ability to directly and automatically propagate workout policy guidance to servicers. The servicers default management utility (SDMU) system of the present application seeks to replace or complement this infrastructure with a system that provides a direct connection between loan servicers and investor. The system preferably makes available to servicers an investor business rules set that is managed by the investor for proactively handling loss mitigation and preferably the capability of the investor to receive and/or to interactively recommend structured workouts electronically. The system described herein will generally deliver these and other capabilities through a SOA (Service Oriented Architecture) model. In this instance, servicers will directly connect their loss mitigation systems to the SDMU system, largely eliminating the need for manual interaction between the servicer and the investor when submitting a loss mitigation case. Other models may also be used including a stand alone system, e.g., accessible by servicers online, which does not interface with the servicer's loan mitigation system, or a hybrid of the stand alone and the SOA system. An exemplary servicers default management utility is described in co-pending U.S. patent application Ser. No. 13/113,067, entitled "SERVICER DEFAULT MANAGEMENT UTILITY SYSTEMS AND METHODS," filed May 22, 2011, the disclosure of which is incorporated by reference herein in its entirety.

At least one embodiment of the SDMU system disclosed herein is expected to result in one or more of the following: reduction in re-default rate as a result of better underwriting and processes from SDMU; reduction in repurchase due to better decisioning provided to Servicers via the SDMU; reduction in incorrect workouts while allowing for higher quality workouts from rules standardization via the SDMU; decreased volume of loans rolling to REO from improved workout execution; and decrease in the volume of non-delegated/exceptions submissions that require review by the investor, which allows the investor efforts to be directed on true exceptions.

Figure 1:
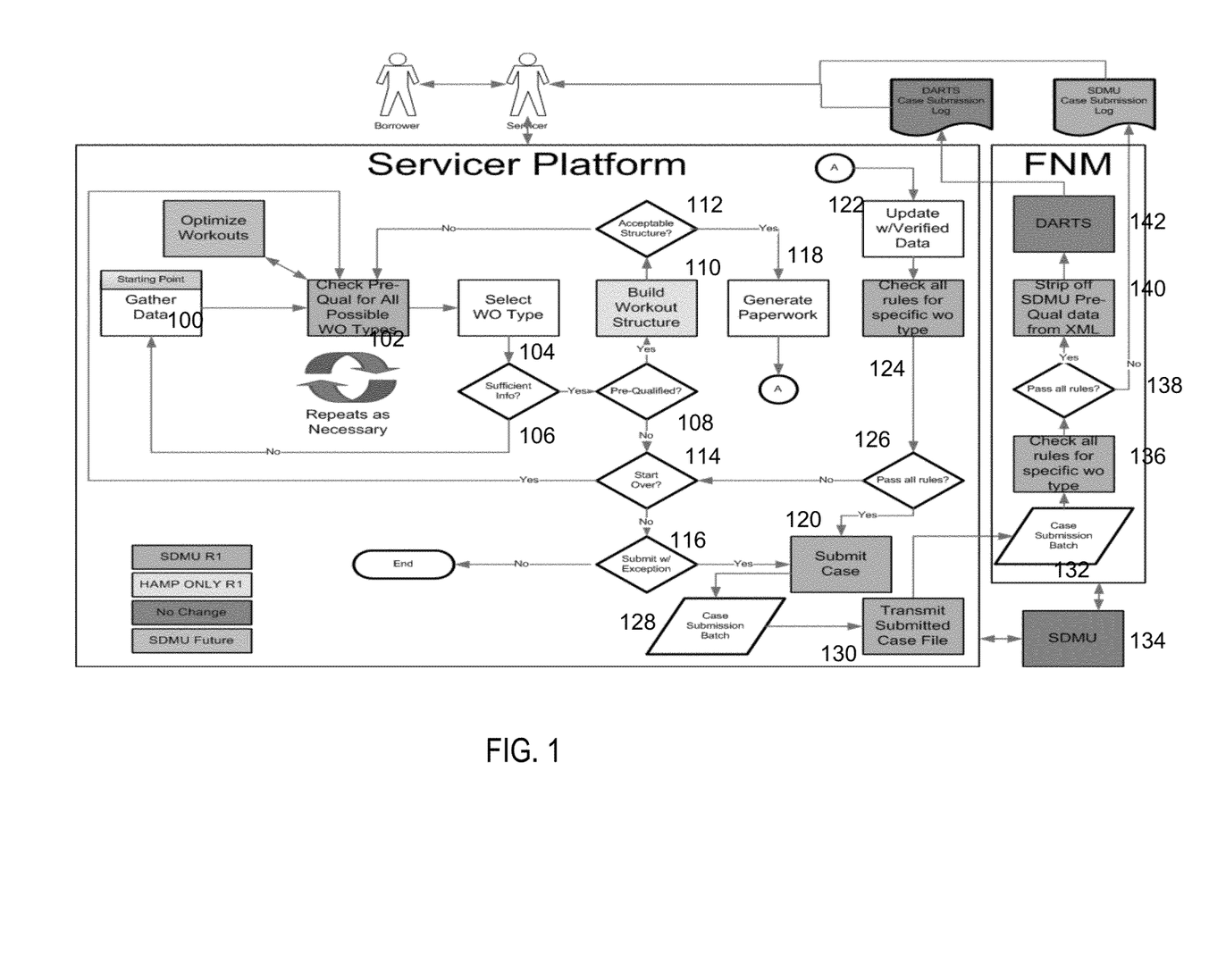
FIG. 1 is a block diagram of a method for managing loan defaults according to at least one embodiment of the methods disclosed herein.

In at least one embodiment, the SDMU application is provided as a callable service, e.g., through web services, APIs, bulk transactions, etc., that loss mitigation software vendors and servicers can use for automated workout decisioning and case reporting (submission). The SDMU can be optimally integrated into servicer's existing default management platforms. The SDMU may provide various types of decisioning, such as preliminary qualification, structuring, and optimization. Preliminary qualification or prequalification refers to the process of qualifying a loan or borrower for a loan workout generally based on preliminary loan, property, and borrower characteristics/information. Structuring refers to the process of developing loan terms and conditions (e.g., payment schedule, monthly payment, interest rate, terms, etc.) calculated generally from borrower financial information. Optimization is the determination of the best loss avoidance or risk mitigation workout based on loan, property, market trends, and borrower characteristics and financials. Case reporting or submission refers to the automated reporting of the loan workout details from the servicer to the investor via a data exchange upon selection of a workout for a borrower FIG. 1 depicts a diagram of the process that servicers may go through when working with borrows, for example, to identify workout type for pre-qualification, develop workout structure, and submit workout cases to the investor. The process is generally accomplished with or over the servicer platform and the investor platform. A platform as used herein is one or a combination of software and computer hardware adapted to perform or otherwise provide the functionality discussed herein.

A servicer is generally the person responsible for interacting with the borrower to obtain information and confirm agreements for the loan workout. Servicers typically use a servicer platform or system to guide/facilitate the loss mitigation process. Investors operate an internal case management system and supporting user interface to manage loans and loan workouts. The SDMU application provided herewith provides a loss mitigation workout type decision engine that preferably interfaces with the servicer platform and the investor internal system to guide the workout process with business rules managed or otherwise dictated by the investor.

The workout process begins with the servicer obtaining data from the borrower or borrowers at 100. Various types of data may be obtained in furtherance of the workout. Some or all of the data is entered into the servicer platform and used at 102 to determine whether the borrower prequalifies for one, some, or all possible workout types available. A selectable list of the workouts that the borrower may prequalify for may be displayed or otherwise communicated to the servicer and/or the borrower. Various types of workouts may be available in the prequalification phase, including Repayment Plan (Repay Plan), HomeSaver Advance (HAS), Home Affordable Modification Plan (HAMP), Modification (Mod), Payment Reduction Plan (PRP), Pre-Foreclosure Sale (PFS), Deed-in-Lieu (DIL), Forbearance (FB), etc. The SDMU may optimize the list of workout types provided to the servicer based on the information made available to the SDMU application. That is, the SDMU determines the best type of workout from the plurality of available workouts based on the information available.

A selection of a particular type of workout may be received at 104 and a determination may be made as to whether there is sufficient information at 106 and/or whether the borrower is prequalified for the selected workout type at 108. If no selection is made, the system may automatically prequalify the borrower for all available workout types. If at 108 it is determined that the borrower is prequalified, the system and the servicer may begin the process of building the workout structure at 110 until an acceptable structure is achieved at 112 and for the paperwork for the workout to be generated at 118.

A borrower is prequalified when the loan/borrower passes all of the prequalification business rules dictated by the investor for each of the available workouts. A borrower may be deemed conditionally prequalified when the loan/borrower passes less than all of the prequalification business rules for the particular type of workout, but none of the business rules failed. This accounts for some of the data required for the particular business rule not being available at the time. This step may be performed by the servicer platform, by the SDMU application, e.g., with data provided from the servicer or the servicer platform, or a combination thereof. The SDMU application preferably interacts with the servicer and/or the servicer's platform in this respect in real time. These steps may be performed by the servicer platform or interactively with the SDMU in real time. These steps may be repeated until an acceptable workout and workout structure is achieved.

In at least one embodiment, at 122 the data is verified and the SDMU at 124 checks to ensure that the workout structure satisfies the business rules for the specific workout type. If at 126 the rules are not satisfied, the process may be repeated until a satisfactory workout is achieved. If, however, at 126 the rules are satisfied, the case may be submitted individually at 120 or in batch form with other cases at 128 to the investor platform. Thereafter, the servicer platform may electronically transmit the submitted case file to the investor platform at 130.

At the investor platform, the case file is received at 132, e.g., in batch form or otherwise. The SDMU 134 checks each case at 136 to determine whether the rules specific to the workout/structure are satisfied. If at 138 the rules are satisfied, the system strips each case of prequalification data at 140 and sends the case to the investor case management system 142 to follow the standard case submission process. That is, the case may include data necessary for the prequalification, but not necessary beyond prequalification. In this instance, the prequalification data is generally removed or filtered out from the case so that the data set remaining matches the data set supported or required by the investor case management system for processing. A log of the case submissions is maintained in either instance of denial and acceptance of the workout prequalification/structuring process.

As noted herein, the business rules are generally managed by the investor. That is, the investor establishes a set of business rules, preferably for each of a plurality of different types of workouts, which are used by the SDMU application to prequalify loans or borrowers for one or more of the available workouts. As such, the investor may be able to modify one or more of the business rules as needed. In the SOA and hybrid models, the changes to the business rules are generally implemented at the investor platform. This beneficially allows the business rules to be changed without any impact on the servicer platform. In the stand alone model, the servicer platform or a portion thereon may be updated with the new business rules with a software patch or update.

Given a specific loan and associated borrower, property, and loan prequalification data points, the SDMU application generally prequalifies the borrower for a set of workout types. In at least one embodiment, the SDMU application assigns, for each workout type assessment, one of the following findings: Pre-Qualified (green), Conditionally Pre-Qualified (yellow), and Declined—(red). Preferably, the SDMU will provide a prequalification response or message, which includes the finding and specific details relating to the finding for each workout type, such as each rule fired, the data used to fire each rule, and any message resulting from the firing of each rule, e.g., fired or not fired.

Figure 2:
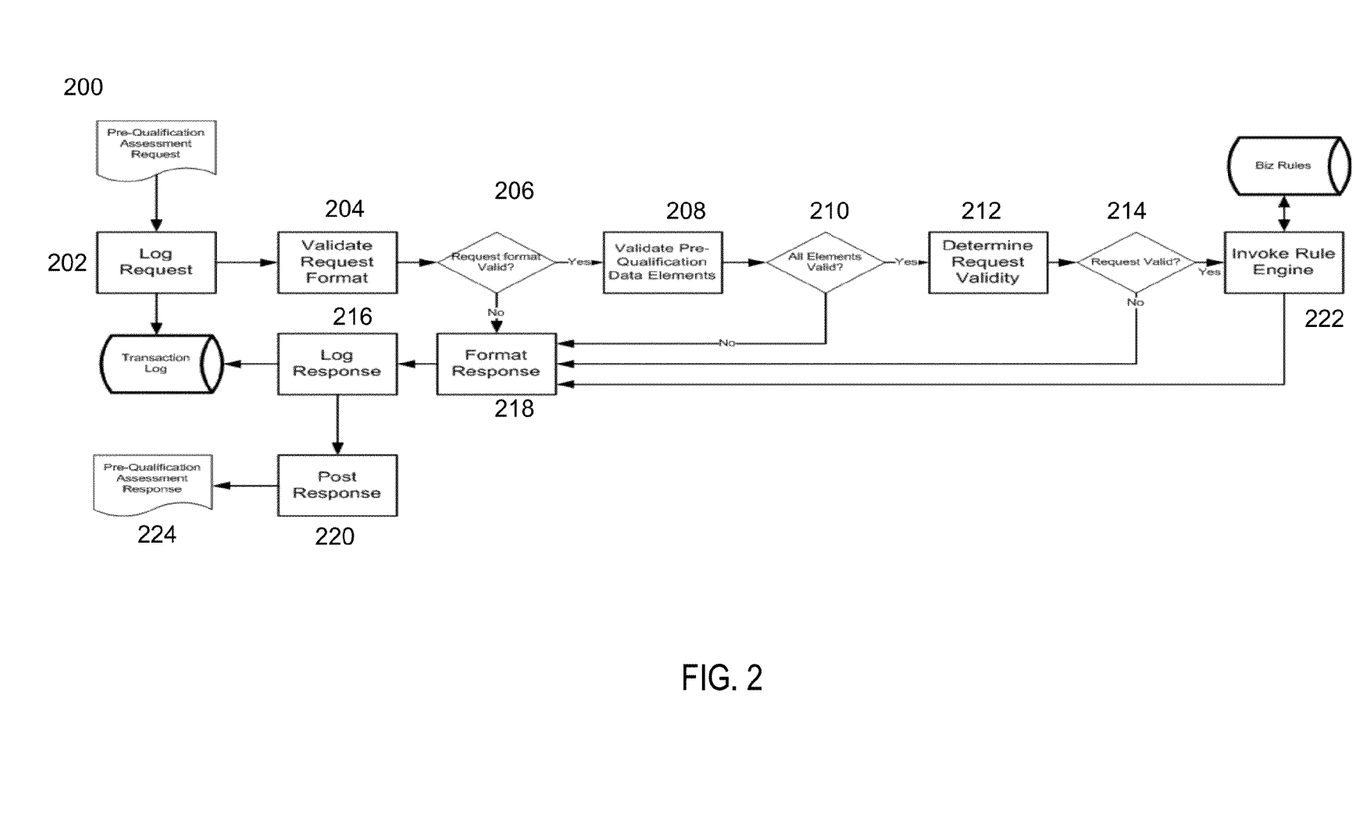
FIG. 2 is a block diagram of a method for prequalifying a loan for a loan workout according to at least one embodiment of the methods disclosed herein.

Referring to FIG. 2, the process of prequalifying a borrower/loan according to at least one embodiment begins at 200 with a request for prequalification, e.g., from the servicer platform. The request generally includes data elements for the rules engine to perform the prequalification check. A log of the request may be made at 202 and the servicer supplied data elements may be validated at 204. That is, the system may determine at 206 whether the data elements supplied are in the proper format, e.g., is the data a proper investor loan number, etc. If not, an appropriate response may be formatted at 218. Thereafter, the system may validate the data elements at 208. That is, the data elements may be examined to determine at 210 whether the data meets minimum requirements, e.g., is the value numeric, character, or alpha-numeric, does the value satisfy reasonableness thresholds, is the data a valid allowable value, etc. If not, an appropriate response may be formatted at 218.

The system may then at 212 determine the validity of the request. That is, a determination is made as to whether the workout type submitted is a valid workout type. If a workout type is not provided, the system may populate the request with all possible workout types. If at 214 there is at least one valid workout type, the system may proceed to invoking the rule engine at 222. The rule engine is preferably invoked for each workout type being requested. In at least one embodiment, invoking the rule engine entails formatting the service request in accordance with the underlying business rule application, applying the appropriate set of prequalification rules, and returning a summary and the details of the result of the prequalification test for each of the workouts, including rules that were fired and those that were not fired. The appropriate response may be formatted at 218, logged at 216, and posted at 220. Once posted, the response may be communicated to the servicer and/or the borrower at 224. This process is preferably preformed so that servicers receive a real time prequalification assessment on a loan by loan basis.

With regard to the business rules, it is understood that investors may flexibly set the rules for prequalification for each type of workout based on their business judgments or requirements. As such, particular business rules applicable to one type of workout may not be applicable to another type of workout. Similarly, a plurality of different types of workouts may use the same rule. As can be seen, each of the rules may be applied at different parts of the process and in a specified sequence. That is, the investor maintained rules may include a set of rules applicable for eligibility for a particular workout and another set of rules applicable for the structure of the workout. Similarly, the data elements required for a rule or rule set specific to one workout type may differ from that required for a rule or rule set specific to another workout type. As can be appreciated, some or all of the data elements for a HAMP workout may not be necessary for another type of workout, such as a DIL.

Cases for prequalification and structuring may be submitted in any compatible format in single and/or batch form. The format, for example, may be an electronic record in XML format that contains the data elements necessary for the processes discussed herein. Upon receipt of the file, the SDMU parses the file and processes each case therein individually. The SDMU will generally apply the prequalification set of business rules and determine whether or not the case is rejected. For non-rejected cases the SDMU calls the workout structure build and validate service for the particular workout type. In this instance, the SDMU may suggest an appropriate structure based on the data elements received or it may determine whether structure submitted by the servicer via the case file satisfies the set of relevant business rules. For non-rejected cases the SDMU then calls the case validation build and validate service for the particular workout type. Cases that pass validation are passed to the investor system for processing.

Figure 3:
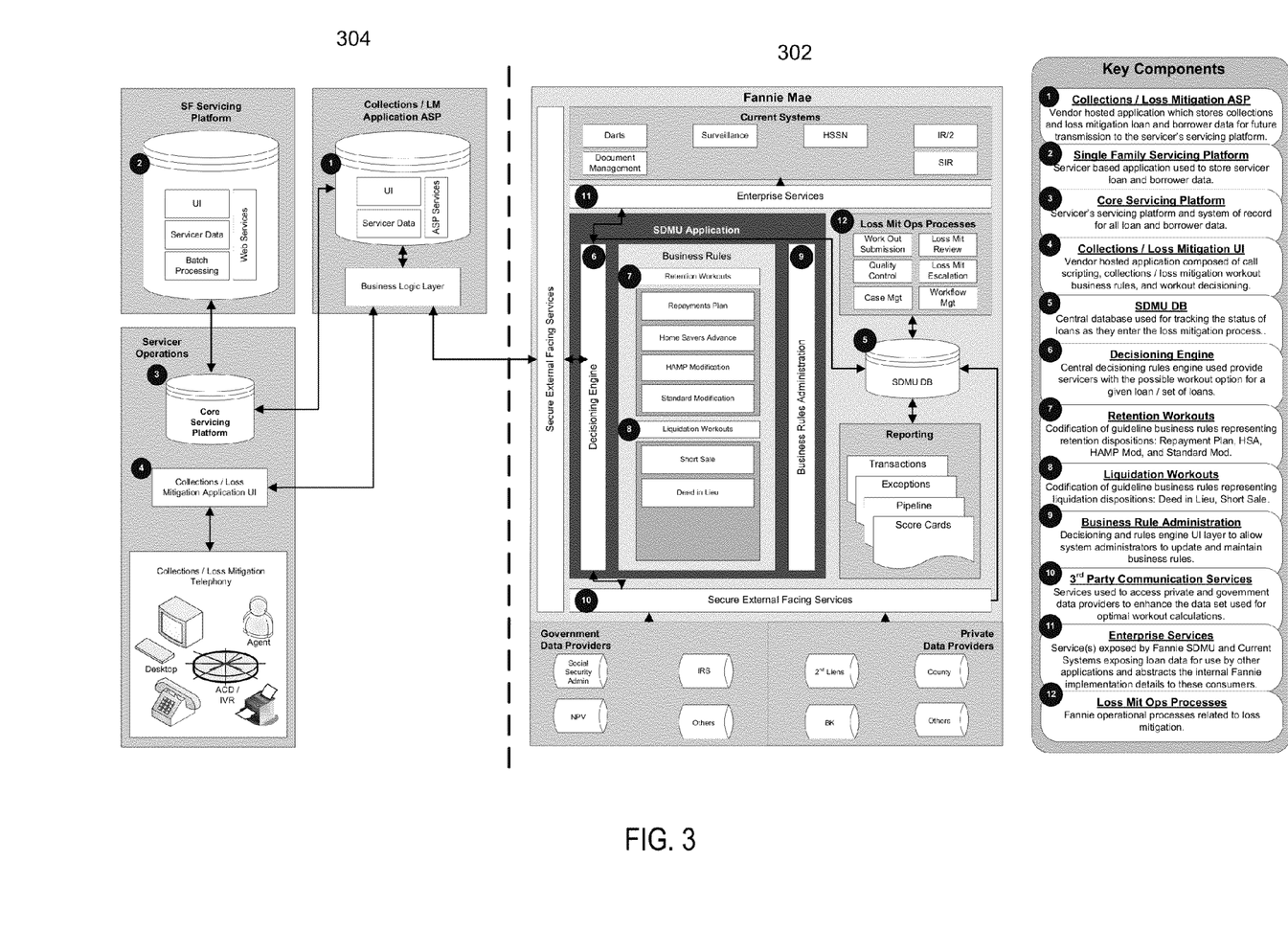
FIG. 3 is a block diagram of a servicer default management utility system according to at least one embodiment of the systems disclosed herein.

As noted herein, the SDMU may be executed in a variety of different types of computing platforms. Referring to FIG. 3, in one embodiment, the SDMU is executed by at least investor side computing device coupled over a communication network to at least one servicer side computing device. The investor's side computing device may be any type of device capable of providing the functionality discussed herein, such as a server computer or a set of server computers, a personal computer, or a combination thereof. The investor side computing device and the SDMU application generally make up the investor platform 302. The servicer side computing device may similarly be any type of device capable of communicating information in the manner discussed herein with the SDMU, such as a server computer, personal or client computer, etc., or a combination thereof. The servicer side computing device generally makes up the servicer platform 304.

In at least one embodiment, the servicer platform 304 includes a core servicer platform that interfaces with a collections/loss mitigation application ASP and a single family servicing platform. The collections/loss mitigation application ASP provides a user interface and the ASP services, and maintains servicer data, such as loan and borrower data. The single family servicing platform similarly provides a user interface and web services, and maintains servicer data. The servicer platform 304 may also include a collection/loss mitigation application user interface that is composed of call scripting, collections/loss mitigation workout business rules, and workout decisioning. As shown, the collections/loss mitigation application ASP may further include a business logic layer that interfaces with the core servicing platform and the collection/loss mitigation application user interface.

In at least one embodiment, the investor platform 302 includes at least one computing device that has stored thereon the SDMU application that when executed performs the functionality and/or the methods discussed herein. As shown, the SDMU application interfaces with the servicer platform via the business logic layer. The SDMU includes the set of business rules for each workout type. The data elements for decisioning are received from the servicer platform 204. The SDMU application further has access to data not available to the servicer, such as Government data, such as social security and internal revenue service data, and private data. The SDMU may further interface with the investor's enterprise services for processing post prequalification and structuring as discussed herein.

The system or parts thereof may be adapted for use to analyze a portfolio of loans for various purposes. For example, the SDMU may analyze a plurality of loans in a portfolio to proactively identify beneficial workouts and structuring. That is, the SDMU may process in the data associated with a plurality of the servicer's loans, e.g., without a particular request from the servicer, and identify therefrom loans that may benefit from a workout. The SDMU may further factor in data from sources other than the servicer that may not be available to the servicer. For example, the SDMU may use data from the IRS or Social Security Administration that may indicate that a borrower's income has dropped since the origination of the loan. In this instance, this data combined with the servicer's data may cause the SDMU to identify the borrower/loan as a candidate for a workout based on this additional data. This type of monitoring may be performed for a particular population of borrowers and candidates for workouts targeted proactively. The SDMU may also track the performance of loans after modification and to evaluate the servicer.

Figure 4:
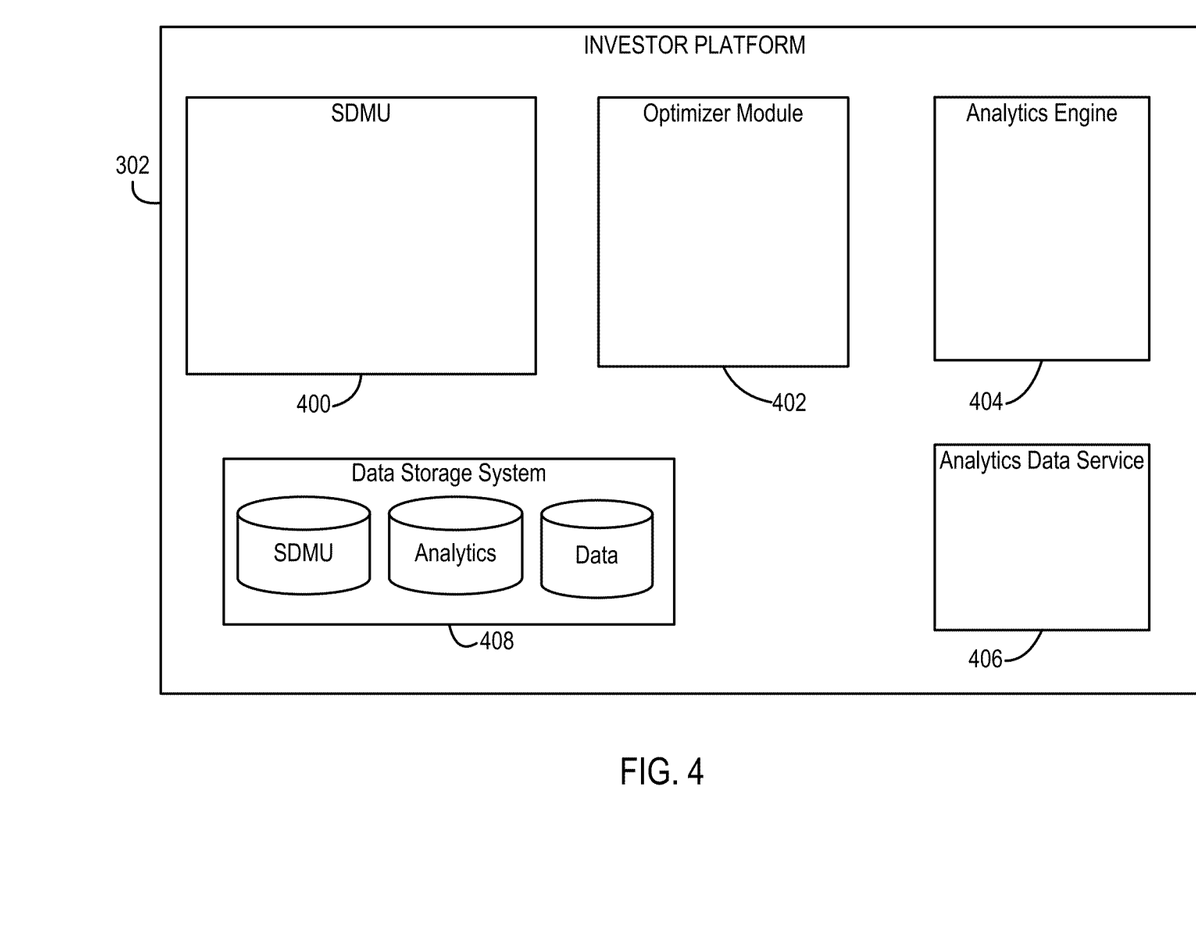
FIG. 4 further illustrates an exemplary investor platform according to one embodiment of the systems disclosed herein.

FIG. 4 further illustrates an exemplary investor platform 302 according to one embodiment. The investor platform 302 includes one or more computing devices that execute a SDMU application 400. The SDMU 400 is coupled to an optimizer module 402 executed by one or more computing devices. The optimizer module 402 is coupled to analytics engine 404 that includes a data service 406. The investor platform includes one or more data storage devices 408.

As noted herein, the SDMU may provide structure decisioning. That is, the SDMU will be able to determine wither or not a particular workout structure is acceptable and/or offer acceptable structures based on applicable business rules. For example, the SDMU may accept or suggest the following terms in relation to a HAMP workout: DTI %, waterfall result, net present value (NPV) result, interest rate, loan terms and conditions, forbearance amount (if applicable), trial period monthly payment amount, trial period schedule, etc.

The decisioning with regard to prequalification and structuring may be optimized by the SDMU via the optimizer module 402. That is, the optimizer module 402 may suggest the optimum workout and/or or the optimum structure (terms and conditions) based on a particular objective function. The objective function is determined by the business objectives. These business objectives can include outcomes that benefit the borrower (e.g., redefault rate, principal forgiveness) and outcomes that benefit the investor (e.g., net present value). Those skilled in the art will recognize that there are well-known functions used to express preferences for multi-criteria preferences. In one embodiment the proposed objective function is to maximize the estimated NPV cash flow from the modified loan, less a penalty based on the loan's estimated redefault rate, with the tradeoff between the discounted cash flow and redefault rate governed by a "dial" or trade-off factor. The dial is specified in units of NPV dollars per percentage point redefault, and can be interpreted as the maximum willingness to pay for a marginally lower redefault rate in the form of lower NPV. The objective function then takes the form $$F = NPV_{mod} - d \times CFR_{mod}$$

where the dial d may for example take values in the range of $0 to $2000 per percentage point redefault. Other ranges including maximums greater than $2000 can be used. Note that this functional form includes as a special case pure NPV maximization when the dial is set to $0.

In another embodiment, the optimizer module 402 can also implement a business rule relating to how much NPV can be reduced, relative to the maximum attainable NPV, in exchange for a lower redefault probability. This "cap" business rule can be executed as an additional constraint to the maximization:

$$NPV_{mod}^{max} - NPV_{mod}(t,r,f) \le S^{lmt}$$

where $$NPV_{mod}^{max} = \max_{(t,r,f) \in \Gamma} NPV_{mod}(t, r, f),$$

$NPV_{mod}(t,r,f)$ is the NPV of a candidate mod, and
$S^{lmt}$ is the cap that limits how much NPV can be given away in order to lower the re-default rate.

In still yet another embodiment, the optimizer module 402 can execute an objective function that specifies a linear trade-off between NPV and redefault, with additional constraints to prevent excessive subsidization of any individual loan, and to ensure reasonable affordability of the mod for high-DTI (debt to income) borrowers:

$$\max_{(t,r,f)} NPV_{mod}(t, r, f) - d \times CFR_{mod}(t, r, f)$$

$$s.t. \begin{cases} (t, r, f) \in \Gamma \\ PmtChg < PmtChg^{lmt} \\ NPV_{mod}^{max} - NPV(t, r, f) \le S^{lmt} \end{cases}$$

where $$NPV_{mod}^{max} = \max_{(t,r,f)} NPV_{mod}(t, r, f)$$

$$s.t. \begin{cases} (t, r, f) \in \Gamma \\ PmtChg < PmtChg^{lmt} \end{cases}$$

$NPV_{mod}$ is modified NPV;
$CFR_{mod}$ is cumulative five-year re-default probability of the modified loan;
d is the "dial" that will allow us to trade off NPV for re-default at the margin;

$S^{lmt}$ is the maximum NPV subsidy per loan;
t is modified remaining term;
r is the initial rate after modification;
f is the percent of UPB forborne till end of the loan life;
Γ is the set of feasible grid points (t, r, f);

$$PmtChg = \frac{Pmt_{mod} - Pmt_{NoMod}}{Pmt_{NoMod}};$$

and $$PmtChg^{lmt} = \begin{cases} +\infty & \text{if } DTI \le 32\% \\ 32\% - DTI & \text{if } 32\% < DTI \le 42\% \\ -10\% & \text{if } DTI > 42\% \end{cases}$$

In another embodiment, the NPV can be normalized by UPB, which can create different optimization results than calculating a non-normalized NPV. For example, one scenario could compare two loans having the same characteristics except loan A has a balance of $50K, and loan B has a balance of $500K. For a non-normalized NPV, one consideration is whether a ten percentage point reduction in the re-default rate is worth sacrificing the same amount of NPV dollars (e.g., $5,000) in each case. For a normalized NPV, one consideration is whether it is worth sacrificing the same NPV as a percentage of UPB (e.g., 5% of UPB) in each case.

In yet another embodiment, the objective function can minimize credit loss and maximize payment decrease. Those skilled in the art will recognize that there are numerous criteria that can be considered in formulating the objective function.

In some embodiments, the search space can include dimensions in addition to, or in replacement of, term, rate, and forbearance. For example, a rate step dimension could be included that considers when and by how much the rate steps up. A principal forgiveness dimension could be included that considers how much principal is forgiven. Any term of the loan modification could be considered for the search space dimension. Those skilled in the art will recognize that other factors can be considered in trying to maximize the objective function.

Given an objective function, the optimizer module 402 can execute a number of alternative algorithms to search the space for possible modification scenarios. For example, the set of all possible combinations of terms (including remaining term, note rate, principal forbearance) can be searched to obtain the recommended modification terms. In one embodiment, the search is performed over a grid of (modified term, modified note rate, principal forbearance) combinations, with the number of grid points for each variable being a pre-set parameter that can be modified via a configuration file. One advantage of using a grid approach is that it is capable of accepting future changes to the modeling environment. Another advantage of the grid approach is that the grid size can be modified depending on the requirements for processing time. For example, a smaller grid with fewer scenarios would yield a quicker response time. In an exemplary embodiment, the optimizer module 402 starts with the {4,7,4} grid specification (i.e. 4 grid points on term, 7 grid points on rate, and 4 grid points on forbearance), giving a total of no more than 112 grid points and an average in our sample of 109 to achieve sufficient accuracy within a reasonable run-time.

In one embodiment the optimizer module 402 can be configured to search a fixed grid $N_t \times N_r \times N_f$ where it means searching $N_t$ grid points on modified remaining term, by $N_r$ fixed grid points on modified rate, by $N_f$ grid points on modified forbearance.

Granularity of search in each dimension d∈{t, r, f} is controlled by an ordered pair ($N_d$, $M_d$) of configuration-file parameters, with the first specifying the maximum number of grid points to be searched, and the second specifying the "rounding unit" that forces chosen grid points to be whole-number multiples of some minimum search increment (e.g., all mod rates tested must be whole-number multiples of 0.25%).

Pre-modification and search-area boundary values can be included in the search, and constitute the bounds of the search area. For example, suppose a loan currently (prior to any modification of terms) has remaining term of 308 months, note rate of 6.25% and no forbearance. Further, suppose programmable business rules have been set such that the modified term is not to be greater than 480 months, modified rates will not be set below 2%, and no more than 30% of UPB will be forborne. Then the values 308 and 480 will both be included in, and comprise the bounds of, the set of terms to be tested; 6.25% and 2% will be included in the set of rates to be tested, and bound that set; and 0% and 30% will be included in, and bound, the set of forbearance levels to be tested. Remaining grid points in each dimension will be chosen from between those lower and upper bounds. Grid points can be indexed beginning with the boundary values, working toward the pre-mod values, so that, for example, $T_1$=480, . . . , $T_{N_t}$=308

To determine internal points the optimizer module 402 divides the distance between pre-mod and boundary values by the desired number of intervals:

$$S_t = \frac{480 - T_{pre-mod}}{N_t - 1}$$

$$S_r = \frac{R_{pre-mod} - 2\%}{N_r - 1}$$

$$S_f = \frac{30\% - F_{pre-mod}}{N_f - 1}$$

The internal grid points are obtained by adding or subtracting computed intervals to pre-mod values:

$T_i$=480−round((i−1)×$S_t$,$M_t$) i=2, . . . , ($N_t$−1)

$R_j$=2%+round((j−1)×$S_r$,$M_r$) j=2, . . . , ($N_r$−1)

$F_k$=30%−round((k−1)×$S_f$,$M_f$) k=2, . . . ,($N_f$−1)

where
$S_t$=interval size for term;
$S_r$=interval size for rate;
$S_f$=interval size for forbearance;
($T_i$,$R_j$,$F_k$),i=1, . . . $N_t$, j=1, . . . $N_r$, k=1, . . . $N_f$ are grid points to be searched;
and
round(x,y) rounds x to the nearest whole-number multiple of y.

Fewer than the specified $N_d$ grid points may be selected in dimension d if there are insufficient whole-number multiples of $M_d$ between the pre-mod level and the boundary level to choose distinct values. For example, if $M_t$=60, pre-mod term=440 and the upper bound on possible mod terms is 480, then only 440 and 480 will be tested as possible post-mod levels of term, even if $N_t$≥3.

Figure 5:
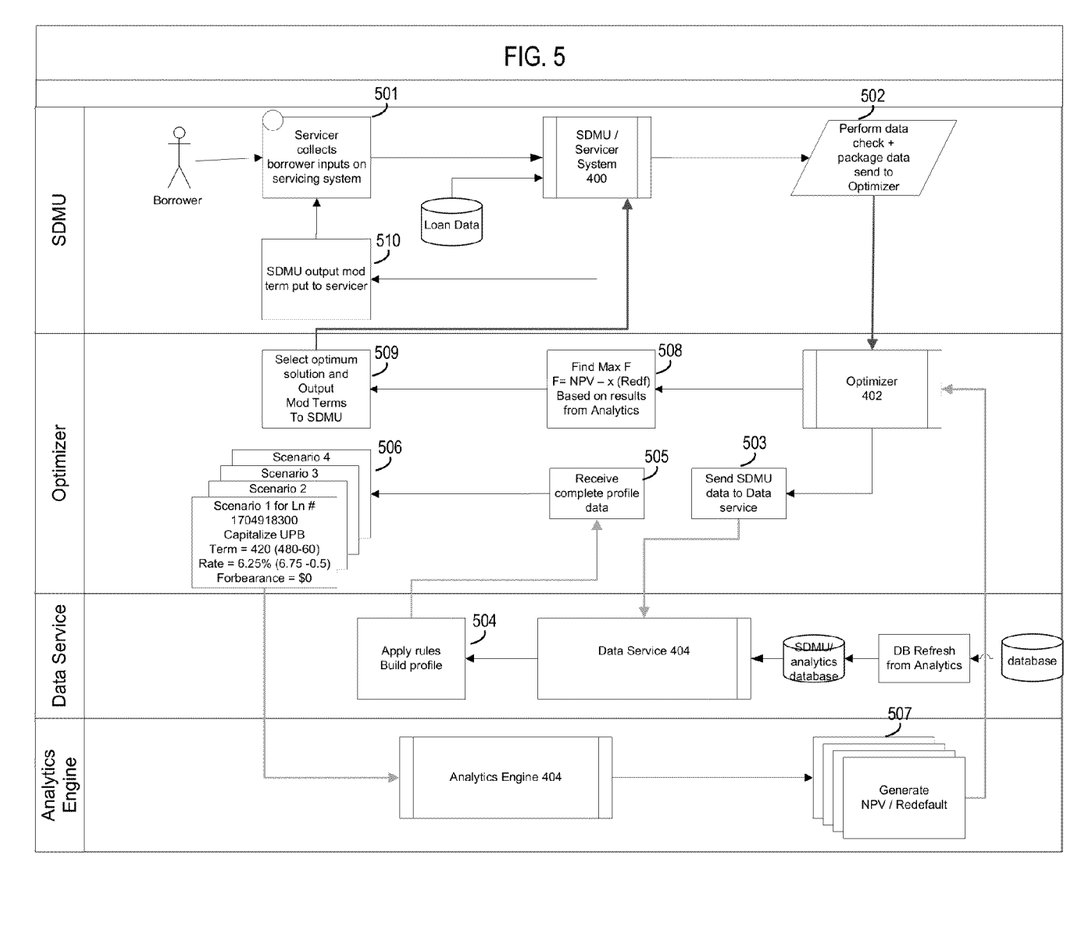
FIG. 5 is a block diagram illustrating the process flow according to at least one embodiment of the systems and methods disclosed herein.

FIG. 5 illustrates the operation of the SDMU and optimization module according to one embodiment of the present invention. At step 501, the servicer collects borrower inputs on the servicing system. The borrower information is provided to the SDMU 400. At step 502 the SDMU checks the data and provides the SDMU data to the optimizer module 402. At step 503 the SDMU data is provided to the data service to retrieve additional data corresponding to the borrower, property, and loan at step 504. The data can include time-sensitive data from the servicer such as the last paid installment date and the unpaid principal balance. The data can also include data from the investor such as property type. A rules engine can determine how to reconcile any discrepancy between servicer data and investor data. At step 505 the optimizer module 402 receives a complete data profile for the loan from data service 406. At step 506, the optimizer module 402 generates possible modification scenarios. The modification scenarios are provided to the analytics engine 404 and at step 507 the NPV and re-default rate are calculated and provided to the optimizer module 402. At step 508 the optimizer module 402 calculates the objective function for all grid points. At step 509 the set of the modified terms that provides maximum value for the objective function are selected and returned to the SDMU 400. At step 510 the modified terms are provided to the servicer.

There are many approaches to search for scenarios that would maximize an objective function. Just a few of the possible approaches to searching for scenarios include a TRF search, a TFR search, and a T–(R×F) search, where T=Term, R=Rate, and F=Forbearance. These searches take advantage of the fact that, in the present modeling environment, term extension is generally the most cost-effective means of achieving a given default reduction, and so is the first contract parameter that should be relaxed when offering a mod. This short-cut greatly reduces the space of potential mods that must be searched, and leads to accurate results with relatively few scenarios required to be tested. For the TRF search, the search first considers potential mods that increase the modified Term relative to the current remaining term of the loan, with no change in note rate and no principal forbearance. Once the modified term has reached a maximum value of 480 months, consider mods that additionally entail lowering the modified note Rate, down to a minimum of 2%. Having reached the maximum allowable modified term and the minimum allowed note rate, only then consider mods with some Forbearance, up to a maximum of 30% of UPB. Note that no potential mod structures with forbearance are tested unless those mods also have the maximum allowable term and the minimum allowable rate; similarly, no mods with rate reductions are considered unless they also have the maximum allowable term. Of the "cube" of all {modified term, modified note rate, principal forbearance} combinations that could be tested, TRF searches only three "edges," leaving the remaining space untested.

Another search method that can be executed by the optimizer module 402 is the TFR search. This search is executed in a manner similar to TRF, but switches the order of application of rate reduction and forbearance; that is, by first increasing term, then increasing forbearance, then lowering rate.

Another search method that can be executed by the optimizer module 402 is the T–(R×F) search. This search is executed by searching by increasing term, then at the maximum term, searching a grid of rate and forbearance combinations.

Still other search methods that can be executed by the optimizer module 402 involves testing modification options that lie on a grid in the space of {term, rate, and forbearance} combinations. One type of grid is a "variable-size grid." It involves searching over all three dimensions in pre-set increments. For example, we could extend the term in 5-year increments, reduce the rate in 1% steps, and apply forbearance in 5%, resulting in a total number of grid points that varies with each loan's starting terms. Forbearance is denominated in percentage points of UPB to be deferred until maturity or loan payoff.

Those skilled in the art will recognize that other optimization approaches can be utilized, including the Newton-Rapson method and others requiring iterative steps.

In one embodiment, two configurable parameters called the dial parameter and the cap parameter control how the optimizer module 402 trades off the objectives of maximizing cash flow vs. minimizing redefault after modification. Other parameters of the objective function could be easily configurable. In one embodiment, the dial parameter places a limit on how much, in NPV $, the optimizer module 402 will give up in order to achieve an additional percentage point reduction in the redefault rate. If the dial parameter is set equal to zero, then the NPV is maximized. Conversely, as the dial parameter increases, the optimizer module 402 places relatively more importance on minimizing the redefault rate, and modification terms tend to become more favorable to the borrower.

The cap parameter sets the limit on the total NPV $ that the optimizer module 402 will give up on any single modification, regardless of what reduction in redefault is possible. As the value of the cap parameter increases, the modification terms tend to become more favorable to the borrower. If the dial parameter is set equal to zero, then the optimizer module 402 ignores the cap parameter.

By configuring the dial and cap parameters, a customized modification strategy can be compared to an alternative rule-based modification program with respect to expected modification volume, redefault rate, impairment, or other portfolio-level outcomes of interest. For example, testing across a range of available options shows that a different set of parameters leads to the best outcome in each dimension:

Mod Volume: Dial=2000; Cap=15000
Re-Default Rate: Dial=2000; Cap=15000
Impairment: Dial=2000; Cap=5000

In an exemplary embodiment, configuration parameters can be modified via a user interface accessible via the investor platform 302. For example, icons representing dial and cap can be configured via a display on a computing device.

The methods and systems described herein are implemented through computing devices as is known to those skilled in the art. A computing device typically comprises a memory unit. The memory unit is a computer-readable storage medium that is capable of storing data and instructions. The memory unit may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, the computing device comprises a processing unit. In various embodiments, the processing unit is implemented in various ways. In a first example, the processing unit may execute software instructions that cause the computing device to provide specific functionality. In this first example, the processing unit may be implemented as one or more processing cores and/or as one or more separate microprocessors. For instance, in this first example, the processing unit may be implemented as one or more Intel Core 2 microprocessors. The processing unit may be capable of executing instructions in an instruction set, such as the x86 instruction set, the POWER instruction set, a RISC instruction set, the SPARC instruction set, the IA-64 instruction set, the MIPS instruction set, or another instruction set. In a second example, the processing unit may be implemented as an application specific integrated circuit (ASIC) that causes the computing device to provide specific functionality. In a third example, the processing unit causes the computing device to provide specific functionality by using an ASIC and by executing software instructions.

The computing device also comprises a video interface that enables the computing device to output video information to a display device. The display device may be a variety of different types of display devices. For instance, the display device may be a cathode-ray tube display, an LCD display panel, a plasma screen display panel, a touch-sensitive display panel, a LED array, or another type of display device.

In addition, the computing device includes a non-volatile storage device. The non-volatile storage device is a computer-readable storage medium that is capable of storing data and/or instructions. The non-volatile storage device may be a variety of different types of different non-volatile storage devices. For example, the non-volatile storage device 208 may be one or more hard disk drives, magnetic tape drives, CD-ROM drives, DVD-ROM drives, Blu-Ray disc drives, or other types of non-volatile storage devices.

The computing device also includes an external component interface that enables the computing device to communicate with external components. The external component interface can communicate with an input device and an external storage device. In one implementation of the computing device, the external component interface is a Universal Serial Bus (USB) interface. In other implementations of the computing device, the computing device may include another type of interface that enables the computing device to communicate with input device and/or output devices. The input device may be a variety of different types of devices including, but not limited to keyboards, mice, trackballs, stylus input devices, touch pads, touch-sensitive display screens, or other types of input devices. The external storage device may be a variety of different types of computer-readable storage media including magnetic tape, flash memory modules, magnetic disk drives, optical disc drives, and other computer-readable storage media.

In addition, the computing device includes a network interface that enables the computing device to send data to and receive data from a network of computing devices. The network interface may be a variety of different types of network interface. For example, the network interface may be an Ethernet interface, a token-ring network interface, a fiber optic network interface, a wireless network interface (e.g., WiFi, WiMax, etc.), or another type of network interface.

The computing device also includes a communications medium that facilitates communication among the various components of the computing device. The communications medium may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

Several computer-readable data storage media (i.e., memory, the non-volatile storage device, and an external storage device) can be used. Together, these computer-readable storage media may constitute a single logical computer-readable data storage medium. In some embodiments, this single logical computer-readable data storage medium stores instructions executable by the processing unit. Actions described in the above description may result from the execution of the instructions stored on this single logical computer-readable data storage medium. Thus, when this description says that a particular logical module performs a particular action, such a statement may be interpreted to mean that the instructions of the logical module, when executed by a processing unit, such as the processing unit, cause the computing device to perform the action.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A computer-implemented data processing system, the system comprising:
    memory configured to store program logic; and,
    a processor, wherein the processor, upon execution of the program logic, is configured to:
    receive loss mitigation data pertaining to a loss mitigation case;
    generate loan workout scenarios for the loss mitigation case, wherein each loan workout scenario represents one of a plurality of modified loan options that differ from each other by one or more of rate, term, forbearance, rate step, or principal forgiveness; and
    adjust a configurable tradeoff factor and a configurable business rule, the configurable tradeoff factor defining a relationship between a net present value of a cash flow from the modified loan options and a redefault rate of the modified loan options such that a constraint is provided on how much the net present value of the cash flow can be decreased in order to achieve a reduction in the redefault rate; and
    identify an optimum loan workout scenario based on an objective function determined by the configurable tradeoff factor and configurable business rule.

2. The system of claim 1, wherein the configurable tradeoff factor is expressed as units of net present value dollars per percentage point of redefault.

3. The system of claim 1, wherein the configurable business rule defines a maximum amount that the net present value of the cash flow from the modified loan options can be reduced to lower the redefault rate.

4. The system of claim 1, wherein the processor, upon execution of the program logic, is further configured to generate a grid of loan workout scenarios based on term, rate, and forbearance.

5. A computer-implemented method of identifying an optimal loan workout, the method comprising:
    receiving, by one or more computer processors, data pertaining to a loss mitigation case;
    generating, by the one or more computer processors, loan workout scenarios for the loss mitigation case, wherein each loan workout scenario represents one of a plurality of modified loan options that differ from each other by one or more of rate, term, forbearance, rate step, or principal forgiveness;
    adjusting, by the one or more computer processors, a configurable tradeoff factor and a configurable business rule, the configurable tradeoff factor defining a relationship between a net present value of a cash flow from the modified loan options and a redefault rate of the modified loan options such that a constraint is provided on how much the net present value of the cash flow can be decreased in order to achieve a reduction in the redefault rate; and determining, by the one or more computer processors, an optimum workout scenario based on an objective function determined by the configurable tradeoff factor and configurable business rule.

6. The method of claim 5, wherein the configurable business rule defines a maximum amount that the net present value of the cash flow from the modified loan options can be reduced to lower the redefault rate.

7. The method of claim 5, further comprising generating a grid of loan workout scenarios based on term, rate, and forbearance.

8. The method of claim 5, wherein the configurable tradeoff factor is expressed as units of net present value dollars per percentage point of redefault.

9. A non-transitory computer readable medium having stored thereon instructions that, upon execution, cause one or more computer processors to:

generate loan workout scenarios for the loss mitigation case, wherein each loan workout scenario represents one of a plurality of modified loan options that differ from each other by one or more of rate, term, forbearance, rate step, or principal forgiveness; and adjust a configurable tradeoff factor and a configurable business rule, the configurable tradeoff factor defining a relationship between a net present value of a cash flow from the modified loan options and a redefault rate of the modified loan options such that a constraint is provided on how much the net present value of the cash flow can be decreased in order to achieve a reduction in the redefault rate; and identify an optimum loan workout scenario based on an objective function determined by the configurable tradeoff factor and configurable business rule.

10. The non-transitory computer readable medium of claim 8, wherein the configurable tradeoff factor is expressed as units of net present value dollars per percentage point of redefault.

11. The non-transitory computer readable medium of claim 8, wherein the configurable business rule defines a maximum amount that the net present value of the cash flow from the modified loan options can be reduced to lower the redefault rate.

12. The non-transitory computer readable medium of claim 8, wherein the instructions, upon execution, further cause the one or more computer processors to generate a grid of loan workout scenarios based on term, rate, and forbearance.

* * * * *